United States Patent [19]

Cacciatore

[11] Patent Number: 4,799,176

[45] Date of Patent: Jan. 17, 1989

[54] ELECTRONIC DIGITAL THERMOSTAT

[75] Inventor: Joseph J. Cacciatore, Westmont, Ill.

[73] Assignee: Harper-Wyman Company, Hinsdale, Ill.

[21] Appl. No.: 946,830

[22] Filed: Dec. 29, 1986

[51] Int. Cl.⁴ .......................... F23N 5/20; G06F 15/20
[52] U.S. Cl. ..................................... 364/557; 364/483;
165/14; 236/91 D
[58] Field of Search .............. 364/505, 506, 557, 483;
165/13, 14, 26–28, 32; 236/91 R, 94, 91 D, 91 F; 340/588

[56] References Cited

U.S. PATENT DOCUMENTS

| | | | |
|---|---|---|---|
| 2,511,022 | 6/1950 | Strysko | 236/91 |
| 2,871,869 | 2/1959 | Howard | 137/82 |
| 3,677,335 | 7/1982 | Weatherston | 165/12 |
| 3,724,534 | 4/1973 | Weatherston | 165/12 |
| 3,847,209 | 11/1974 | Mascall | 165/14 |
| 3,882,928 | 3/1975 | Gazzo | 165/12 |
| 3,912,913 | 10/1975 | Bunting | 235/150.1 |
| 3,929,284 | 12/1975 | Prewarski | 236/46 |
| 3,933,197 | 1/1976 | Zimmer | 165/2 |
| 3,942,718 | 3/1976 | Palmieri | 364/506 |
| 4,071,745 | 1/1978 | Hall | 364/104 |
| 4,079,366 | 3/1978 | Wong | 340/309.4 |
| 4,110,827 | 8/1978 | Shavit | 364/550 |
| 4,162,036 | 7/1979 | Balduzzi | 236/47 |
| 4,191,328 | 3/1980 | Isaacs | 236/46 R |
| 4,200,910 | 4/1980 | Hall | 364/104 |
| 4,206,872 | 3/1980 | Levine | 236/46 |
| 4,215,408 | 7/1980 | Games | 364/505 |
| 4,264,034 | 4/1981 | Hyltin | 236/46 |
| 4,267,966 | 5/1981 | Neel | 236/46 A |
| 4,274,145 | 6/1981 | Hendricks | 364/557 |
| 4,276,925 | 7/1981 | Palmieri | 364/505 |
| 4,277,018 | 7/1981 | Nelson | 236/46 |
| 4,298,946 | 11/1981 | Hartsell | 364/557 |
| 4,316,256 | 2/1982 | Hendricks et al. | 364/505 |
| 4,319,711 | 3/1982 | Barker | 236/46 R |
| 4,335,847 | 6/1982 | Levine | 364/505 |
| 4,373,664 | 2/1983 | Barker | 236/46 |
| 4,388,692 | 6/1983 | Jones | 364/557 |
| 4,408,711 | 10/1983 | Levine | 236/11 |
| 4,428,528 | 1/1984 | Renault | 364/557 |
| 4,431,134 | 2/1984 | Hendricks | 236/46 |
| 4,442,972 | 4/1984 | Sahay | 236/1 EA |
| 4,446,913 | 5/1984 | Krocker | 165/12 |
| 4,460,125 | 7/1984 | Barker | 236/94 |
| 4,497,031 | 1/1985 | Froehling | 364/505 |
| 4,616,325 | 10/1986 | Heckenbach et al. | 364/505 |
| 4,661,914 | 4/1987 | Mulokey et al. | 364/505 |

Primary Examiner—Gary Chin
Assistant Examiner—Brian M. Mattson
Attorney, Agent, or Firm—Mason, Kolehmainen, Rathburn & Wyss

[57] ABSTRACT

A programmable electronic digital thermostat provides improved control of a temperature conditioning system for varying load conditions in order to maintain the ambient temperature within a predefined range of a scheduled set temperature while minimizing ambient temperature overshoots and undershoots. The thermostat includes an improved power supply circuit for simply and effectively providing its operating power utilizing an external alternating current power source of the temperature conditioning system and utilizing conventional existing wiring. The thermostat includes a microprocessor for storing a program and for performing logical control operations in accordance with the stored program and a temperature sensing circuit that provides a pulse width modulated PWM signal representative of ambient temperature in response to an enable control signal from the microprocessor.

15 Claims, 7 Drawing Sheets

ELECTRONIC DIGITAL THERMOSTAT

BACKGROUND OF THE INVENTION

1. Field of the Invention

The present invention relates generally to programmable electronic digital thermostats for use with heating and cooling systems, and more particularly to an improved programmable electronic digital thermostat that provides improved control of the heating and cooling system for varying load conditions in order to maintain the ambient temperature within a predetermined range of the scheduled set temperature while minimizing ambient temperature overshoots and undershoots and that includes an improved power supply circuit for simply and effectively providing its operating power utilizing conventional existing wiring.

2. Description of the Prior Art

Known electronic digital thermostats provide substantial energy savings by controlling conventional temperature conditioning systems in accordance with selected temperatures for a sequence of time intervals.

For example, U.S. Pat. No. 4,298,946, issued Nov. 3, 1981 entitled "Electronically Controlled Programmable Digital Thermostat" discloses a programmable thermostat for maintaining desired temperatures during selected time periods and includes programmed instructions for measuring actual time rate of change of the ambient temperature during heating and cooling cycles to anticipate reaching the desired temperature, for delaying a state change (activate or deactivate) of the heating and/or cooling for a delay time period; and for defining a hysteresis to prevent unnecessary reaction to small changes in the ambient temperature.

U.S. Pat. No. 4,388,592, issued June 14, 1983 entitled "Electronically Controlled Programmable Digital Thermostat Having Variable Threshold Hysteresis With Time" discloses a similar thermostat further including programmed instructions for varying a threshold hysteresis temperature with time in discrete steps around the desired ambient temperature or set temperature. In this disclosed thermostat, each time a switch, such as a triac, for controlling the operation of a temperature condition system changes state, the threshold hysteresis temperature is alternately changed between a positive and negative initial value around the set temperature. This initial value of the threshold hysteresis temperature is maintained for a predetermined fixed time period. The threshold hysteresis temperature is then reduced in a discrete step toward the set temperature unless the measured ambient temperature reaches the initial hysteresis temperature during the fixed time period so that the effective duty cycle rate of the temperature conditioning system is adjusted.

U.S. Pat. No. 4,442,972, issued Apr. 17, 1984 entitled "Electrically Controlled Programmable Digital Thermostat And Method For Regulating The Operation Of Multistage Heating And Cooling Systems" discloses a thermostat similar to that described in U.S. Pat. No. 4,388,592, further including programmed instructions for determining a restart time prior to the next scheduled time interval for initiating operation of the temperature conditioning system to achieve the next temperature at the scheduled time. This patent discloses routines for energy efficient control of a multistage temperature conditioning system that determine whether or not an actual rate of change of zone temperature effected by operation of the main system stage is below a predetermined selected rate of temperature change. An auxiliary system stage is operated only if necessary to achieve the predetermined rate of temperature change.

While such thermostats have provided significantly improved performance as compared to conventional electromechanical thermostats, it is desirable to provide a programmable electronic digital thermostat that provides improved control of the temperature conditioning system for varying load conditions for maintaining ambient temperature within a predetermined desired range of the scheduled set temperature and particularly that avoids thermal overshoots and undershoots, that includes a power supply circuit utilizing an external power source of the temperature conditioning system for simply and effectively providing its operating power, and that includes a temperature detecting circuit for providing a pulse width modulated temperature signal.

SUMMARY OF THE INVENTION

Among the important objects of the present invention are to provide an improved programmable electronic digital thermostat for controlling a temperature conditioning system for varying load conditions; to provide such thermostat utilizing actual heating and cooling history values for determining effective recovery times; to provide such thermostat enabling effective duty cycle control of the temperature conditioning system; to provide such thermostat including a power supply circuit enabling efficient, effective and reliable operation utilizing existing wiring for a conventional electromechanical thermostat; and to provide such thermostat having optimized power requirements.

In brief, in accordance with the above and other objects of the invention, there is provided a programmable electronic digital thermostat for controlling a temperature conditioning system to maintain a scheduled set ambient temperature. The thermostat includes at least one controlled semiconductor switch for selectively activating or deactivating an external relay connected in series with an external power source of the temperature conditioning system. The thermostat includes a power supply circuit utilizing the external alternating current power source. The power supply circuit includes a bridge rectifier connected between the controlled semiconductor switch and the external relay for rectifying the alternating current to produce a direct current voltage. A voltage regulator is coupled at its input to the bridge rectifier for providing a predetermined supply voltage. A capacitor is connected to the voltage regulator input for charging to a first predetermined potential. Control circuitry is connected between the capacitor and the controlled semiconductor switch for sensing the voltage potential of the capacitor and for deactivating the semiconductor switch in response to a sensed voltage potential below a predetermined value, thereby to enable the capacitor to recharge to the first predetermined potential without deactivating the external relay.

The thermostat further includes a microprocessor that performs a stored program for generating control signals for activating and deactivating the at least one semiconductor switch in response to a determined temperature difference between an actual ambient temperature signal and a dynamically adjusted temperature control signal. The temperature control signal is set at an initial maximum value above the scheduled set temperature with each microprocessor output control signal for activating heating and for deactivating cooling and at an initial minimum value below the scheduled set temperature with each microprocessor output control signal for deactivating heating and for activating cooling. The temperature control temperature is adjusted in discrete steps toward the set temperature after an elapsed variable time interval. The variable time interval corresponds to a corresponding variable count for the particular operational state of the thermostat, i.e., a corresponding variable count for one of heating activated, heating deactivated, cooling activated or cooling deactivated. Each variable count is dynamically adjusted for varying load conditions to enable a predetermined ambient temperature change relative to the set temperature and to avoid exceeding the predetermined temperature change with each activation or deactivation of the heating and cooling system. A temperature sensing circuit provides a pulse width modulated PWM signal representative of ambient temperature in response to an enable control signal from the microprocessor.

BRIEF DESCRIPTION OF THE DRAWING

The present invention together with the above and other objects and advantages may be best understood from the following detailed description of the preferred embodiment of the invention illustrated in the drawings, wherein.

DETAILED DESCRIPTION OF THE PREFERRED EMBODIMENT

Figures 1, 2:
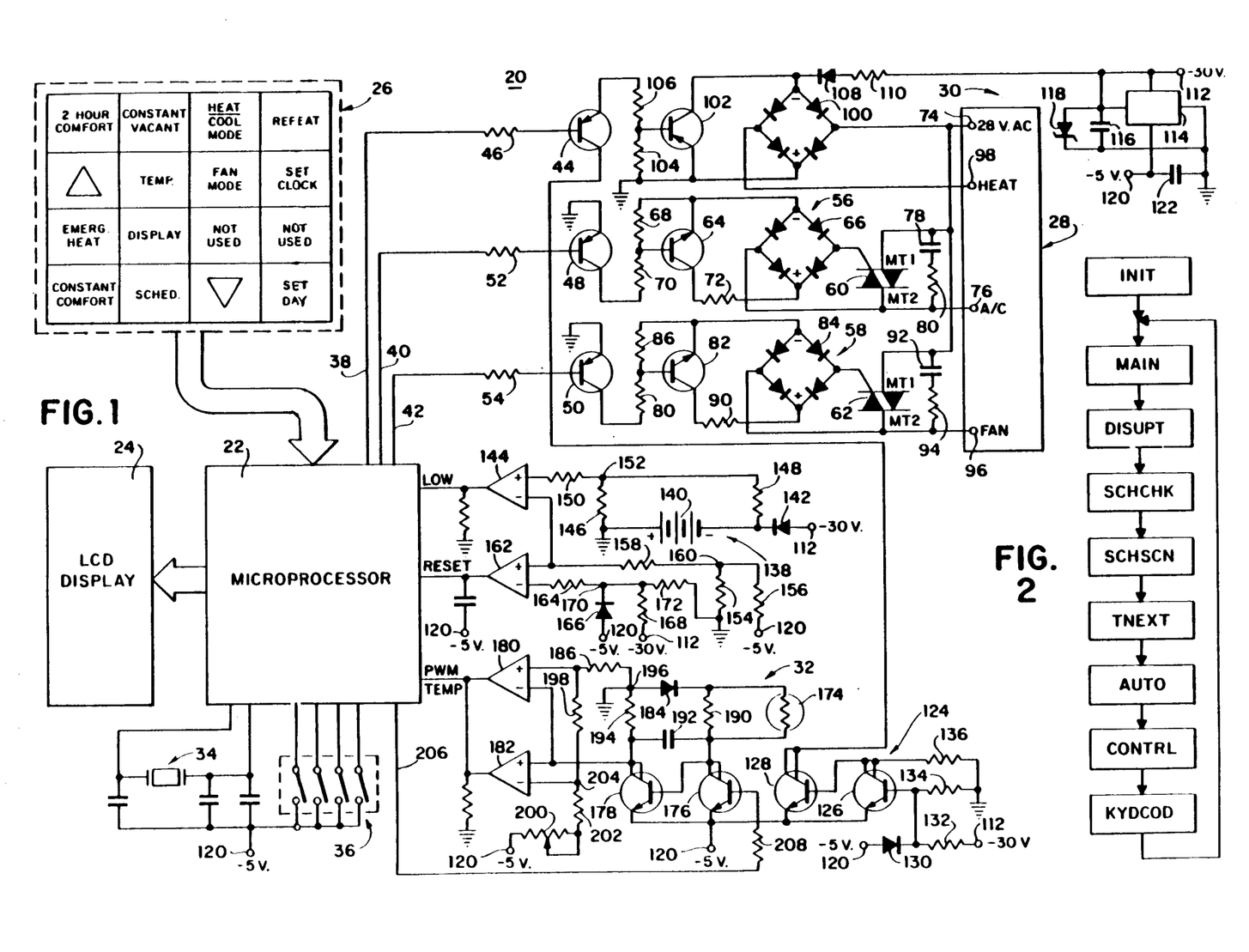
FIG. 1 is an electrical schematic and block diagram representation of a programmable electronic digital thermostat in accordance with the principles of the present invention.
FIGS. 2-14 are flow charts illustrating the logical operations performed by the thermostat of FIG. 1.

Referring initially to FIG. 1, there is shown an electrical schematic and block diagram representation of a programmable electronic digital thermostat 20 arranged in accordance with the principles of the present invention.

The before-mentioned U.S. Pat. No. 4,298,946 issued Nov. 3, 1981 describes the environment of use for the programmable electronic digital thermostat 20. The disclosure of this patent is incorporated herein by reference.

As its major functional components, the programmable electronic digital thermostat 20 includes a microprocessor 22 for performing logical control operations in accordance with a stored program and responsive to real time and actual ambient temperature data, an LCD display 24 for displaying time, temperature, day of week and system indicators, a keyboard 26 for entering time and temperature schedule data and for entering selected modes of operation, an output block 28 for interconnection with various, different types of conventional temperature conditioning systems, a power supply circuit 30 for providing operating power for the thermostat 20 utilizing existing wiring for a conventional electromechanical thermostat, and a temperature detecting circuit 32 for monitoring ambient temperature and providing a pulse width modulated ambient temperature representative signal.

A crystal oscillator circuit 34 preferably supplies a periodic pulse source for the microprocessor 22, so that reliance on a 60 Hz power source as a timing source is avoided. For example, a basic clock frequency of 4.194304 MHz can be applied to the microprocessor 22 by the crystal oscillator circuit 34. The microprocessor 22 includes a read only memory ROM for permanently storing a program for controlling the sequential operations of the thermostat 20, a random access memory RAM for storing coded information including the time and temperature selections entered via keyboard 26 and the real time data including the temperature signal, the current time of day and the day of the week, and an arithmetic logic unit ALU for performing arithmetic and logic operations. Although a variety of commercially available microprocessors having standard capabilities could be used for the microprocessor 22, a low power device such as a complementary metal oxide semiconductor CMOS integrated circuit microprocessor preferably is used. For example, a Toshiba CMOS integrated circuit device TMP47C22F advantageously can be employed for microprocessor 22. This device includes two channels of 12-bit timer/counter TC1, TC2 in RAM with a timer/counter control for specifying the operational mode, a clock generator CG, a timing generator TG, a frequency divider FD, a system control SYS CONTROL for generating internal control signals, a program memory ROM, a data memory RAM and an arithmetic and logic unit ALU.

Coded temperature and time information is entered into the microprocessor 22 and stored in a plurality of registers within the microprocessor's RAM via the key switches of the keyboard 26. By pressing selected key switches, desired temperatures and selected times of a time schedule are stored in the microprocessor 22, thereby programming microprocessor 22 for scheduled set ambient temperature control. In addition, override selection data is entered into the microprocessor 22 via the keyboard 26 by operation of predetermined switches including, for example, 2 HOUR COMFORT or CONSTANT COMFORT for selecting comfort temperature for a predetermined time such as two hours or unlimited time without changing the selected scheduled program. Similarly a CONSTANT VACANT switch may be employed for selecting a setback or vacant temperature for unlimited time such as for a vacation selection. Also, system operational mode control selections are entered into the microprocessor 22 by manual operation of a HEAT/COOL MODE switch to the keyboard 26. The operational mode selections include a heat mode, a cool mode and an automatic mode. The selection of the automatic mode enables automatic changeover from the cool mode to the heat mode and from the heat mode to cool mode. A constant fan on or an automatic fan operation selection is entered into the microprocessor 22 by manual operation of a FAN mode switch of the keyboard 26.

A plurality of manually operable switches 36 are connected between a supply voltage (−5 V) and predetermined input ports to the microprocessor 22 for applying either a logic HIGH or LOW signal indicating predefined user selections. These selections include, for example, a keyboard lockout selection so that the microprocessor 22 will not respond to subsequently entered user selections except for the 2 HOUR COMFORT selections centered via keyboard 26, and a temperature display selection for controlling the microprocessor 22 for generating temperature signals for displaying temperature in either degrees Fahrenheit or degrees centigrade on the LCD display 24.

The microprocessor 22 generates control signals at predetermined output ports for selectively activating and deactivating the heat relay, the air conditioning A/C relay and fan relay, respectively, to maintain the scheduled set ambient temperature in accordance with a stored program. The microprocessor heat control signal is applied at a line 38, the air conditioning control signal is applied at a line 40 and the fan control signal is applied at a line 42. The microprocessor heat control signal is applied to the base of a PNP switching transistor 44 via a resistor 46. Similarly, the microprocessor air conditioning and fan control signals are applied respectively to the base of a PNP switching transistor 48 or 50 via a resistor 52 or 54. The transistors 48 and 50 are respectively arranged with the emitter connected to ground potential and the collector connected to a gating circuit 56 or 58 for gating a triac 60 or 62. Triac gating circuit 56 includes a switching NPN transistor 64 enabled by the transistor 48, a full wave bridge rectifier 66 for supplying rectified voltage to the transistor 64 and the gate of triac 60 and biasing resistors 68, 70 and 72.

A terminal 74 of output block 28 that is connected to the common 28 volt AC supply line of the temperature conditioning system is connected to the MT1 input of triac 60. A controlled output for connection with the air conditioning A/C relay at a terminal 76 is connected to the MT2 input of triac 60 and to a first center input terminal of the bridge rectifier 66 with its second center input terminal connected to the gate of the triac 60. The negative input terminal of the bridge rectifier 66 is connected to the emitter of transistor 64. The emitter of transistor 64 is connected to its base through the resistor 68. The positive output terminal of the bridge rectifier 66 is connected to the collector of transistor 64 through the resistor 72. The base of transistor 64 is connected to the collector of transistor 48 through resistor 70, so that transistor 64 is turned ON or rendered conductive simultaneously with the transistor 48. When transistor 64 is ON, a gating signal is applied to enable the triac 60 to energize the A/C relay. A snubber network including a series combination of a capacitor 78 and a resistor 80 is connected between the terminals 74 and 76 to prevent misfiring of the triac 60.

The triac gating circuit 58 is similarly configured and includes an NPN transistor 82, a bridge rectifier 84 and biasing resistors 86, 88 and 90. An identical snubber network including a series combination of a capacitor 92 and a resistor 94 is connected between the terminal 74 and the controlled output for the fan relay at a terminal 96.

The controlled output for connection with the heat relay at a terminal 98 is connected to an input of a bridge rectifier 100 with its other center input connected to the 28 volt AC terminal 74. The positive output terminal of the bridge rectifier 100 is connected to ground, and its negative output terminal is connected to the collector of a PNP transistor 102 that is controlled by the transistor 44 for energizing the heat relay. The emitter of the transistor 102 is connected to ground and to its base through a resistor 104. The base of the transistor 102 is connected through a resistor 106 to the emitter of transistor 44.

Rectified voltage is supplied by the bridge rectifier 100 for the operating power supply 30. The negative output of the bridge rectifier is coupled through a series combination of a diode 108 and a resistor 110 to an input 112 of a voltage regulator integrated circuit device 114.

A parallel combination of a capacitor 116 and a Zener diode 118 is connected between the input 112 and ground to limit charging of the capacitor 116 to a first predetermined voltage potential, for example, negative 30 volts, established by the Zener diode 118. The voltage regulator 114 provides a regulated voltage at its output 120, for example, negative 5 volts. A filtering capacitor 122 is connected between the output 120 and ground.

A voltage sensing circuit 124 monitors the voltage potential of the capacitor 116 at the regulator input terminal 112 for disabling the switching transistor 44 and thereby disabling power transistor 102 at a predetermined sensed low voltage potential to enable the capacitor 116 to recharge to the first predetermined voltage level. The voltage sensing circuit 124 includes a first and second NPN transistor 126 and 128. The base of transistor 126 is connected to the regulated supply voltage output terminal 120 through a diode 130 and is connected to the rectified voltage input terminal 112 through a resistor 132. The base of transistor 126 is also connected through a resistor 134 to ground with its emitter connected to the regulated supply voltage output terminal 120. The collector of transistor 126 is connected to ground through a resistor 136 and to the base of the transistor 128. The emitter of transistor 128 is connected to the regulated supply voltage output terminal 120 and its collector is connected to the collector of the switching transistor 44.

In operation, transistor 44 is rendered conductive responsive to the microprocessor deactivating control signal at line 38 with the transistor 128 being conductive or turned ON. When the transistor 126 is rendered conductive responsive to a predetermined low voltage at terminal 112, the transistor 128 is rendered nonconductive causing the switching transistor 44 to turn OFF. In response, the control transistor 102 is rendered momentarily nonconductive until the capacitor 116 is recharged to its first predetermined potential. Once the capacitor 116 is recharged, the transistor 126 is rendered nonconductive so that the control transistor 102 is again conductive responsive to the microprocessor activating control signal at line 38. The capacitor 116 has a predetermined value, for example, 0.047 mF, so that such recharging operation is enabled within a sufficiently small time interval without interfering with the operation of or deactivating the heat relay.

The operating power supply circuit 30 further includes a battery backup circuit 138 for providing operating power when the 28 volt AC supply at terminal 74 is interrupted causing the voltage potential of capacitor 116 to drop below the battery voltage potential. Circuit 138 provides a LOW battery signal and a RESET signal that are applied to the microprocessor 22. A battery 140, such as a 9-volt transistor battery is connected at its negative terminal to the regulator input terminal 112 via a blocking diode 142 with its positive terminal connected to ground. A comparator 144 produces the LOW battery signal at its output in response to a predetermined detected battery voltage. A voltage divider combination of a pair of series connected resistors 146 and 148 is connected between ground and the negative terminal of the battery 140. A resistor 150 is connected between the non-inverting input of the comparator 144 and the junction 152 of the series connected resistors 146 and 148. A predetermined reference voltage is applied to the inverting input of the comparator 144. A voltage divider combination of a pair of series connected resistors 154 and 156 is connected between ground and the regulated supply voltage output terminal 120. A resistor 158 is connected between the junction 160 of the series connected resistors 154 and 156 and the inverting input of the comparator 144. In response to a resulting LOW battery output signal of comparator 144, the microprocessor 22 generates a low battery signal for displaying on the LCD display 24.

A second comparator 162 provides a RESET signal at its output that is applied to a reset input of the microprocessor 22 in response to a second predetermined low voltage. The inverting input to the comparator 144 is connected to a non-inverting input of the comparator 162. The inverting input of comparator 162 is connected to the regulated supply voltage output terminal 120 through a series combination of a resistor 164 and a diode 166. A resistor 168 is connected between a junction 170 of the series connected resistor 164 and diode 166 and the terminal 112 with a second resistor 172 connected between the junction 170 and ground, thus arranged to provide the second predetermined low voltage reference potential.

Temperature detecting circuit 32 provides a pulse width modulated PWM temperature signal that is applied to a timer/counter input port, for example, the timer/counter TC2 input of the microprocessor 22. The temperature detecting circuit includes a thermistor 174, a pair of NPN transistors 176 and 178 and a pair of comparators 180 and 182. The thermistor 174 has a resistance value that varies in relation to the ambient temperature. As configured within the temperature detecting circuit 32, the thermistor 174 provides a time constant variable with ambient temperature. One end of the thermistor 174 is connected through a diode 184 to ground. A resistor 186 is connected between the anode of the diode 184 and a non-inverting input of the comparator 180. The collector of the transistor 176 is connected to the opposite end of the termistor 174 and to the base of the transistor 178. A resistor 190 is connected in parallel with the thermistor 174 and in series with a timing capacitor 192 connected between the collectors of the transistors 176 and 178. A resistor 194 is connected between ground at a junction 196 of the series connected diode 184 and resistor 186 and the collector of transistor 178.

A voltage divider combination of the resistor 186 and a first and second resistor 198 and 200 and a variable resistor 202 is connected in series between ground and the regulated voltage supply terminal 120. A junction 204 of the resistors 198 and 200 is connected to the inverting input of the comparator 182. A first reference voltage is applied to the non-inverting input of the comparator 180. A second reference voltage is applied to the inverting input of the comparator 182. The non-inverting input of comparator 182 is connected to the collector of the transistor 176 and to the inverting input of the comparator 180. The comparators 180 and 182 have an open collector output, and can be implemented, for example, with an integrated circuit device type LM339 sold by Motorola, Inc. The outputs of the comparators 180 and 182 are connected together and to the timer/counter TC2 input of the microprocessor 22. The signal at the common output of the comparators 180 and 182 at a line PWM TEMP is LOW or at −5 volts when either the voltage potential at the collector of the transistor 178 is above the first reference voltage applied to non-inverting input of comparator 180 or below the second reference voltage applied to the inverting input of the comparator 182. Otherwise, when the voltage potential at the collector of the transistor 178 is in a range between the first and second reference voltages, the common output signal is HIGH or at ground potential. A microprocessor control signal for enabling ambient temperature measurement at a line 206 is applied to the base of the transistor 176 through a resistor 208.

In operation, the capacitor 192 is charged to a predetermined potential with the transistor 176 ON and the transistor 178 OFF. The transistor 176 is turned OFF by the microprocessor control signal applied to its base. In response, the transistor 178 is turned ON and the capacitor 192 is then discharged, providing a signal having a pulse width representative of the ambient temperature at the common output of the comparators 180 and 182 shown at the line labelled PWM TEMP.

Referring now to FIG. 2, there is shown a flow chart illustrating the program permanently stored in the ROM of the microprocessor 22 provided in accordance with the principles of the invention for the programmable electronic digital thermostat 20. An exemplary source code for this firmware is provided as an Appendix I included in the file wrapper of the application only. This exemplary source code includes the subroutine names used in the following description and also includes explanatory comments.

The program starts with an initialization INIT subroutine performed upon power up of the thermostat 20 with predetermined default and initial values set within the RAM of the microprocessor 22. Next a MAIN subroutine is performed for enabling interrupts for the microprocessor 22 and for providing a predetermined program time delay, such as 0.1 second before branching to the next sequential subroutine.

Next a display update DISUPT subroutine is performed for updating the display 24. Following the DISUPT subroutine, a schedule check SCHCHK subroutine is performed when in a programming mode to check that valid schedule data is being entered as programmed by the user. For example, when a heating temperature is being entered via the keyboard 26 a valid data check is performed to determine if the heat temperature is less than or equal to the cool temperature. When the selected heat temperature is greater than the cool temperature, the stored cool temperature is changed to equal the selected heat temperature and a warning indication is displayed for viewing by the user, such as flashing the display 24.

After the completion of the SCHCHK subroutine or when not in the programming mode following the DISUPT subroutine, a schedule scan SCHSCN subroutine is performed for timekeeping operations to maintain the set heat and cool temperatures in accordance with the user programmed time and temperature schedule. The sequential operations continue with a TNEXT subroutine performed with the calculation of a restart time for recovery from a scheduled vacant period to the next comfort period. The TNEXT subroutine is illustrated and described in detail with respect to FIGS. 6 and 7. Next an AUTO subroutine is performed for monitoring the ambient temperature change relative to the scheduled set temperature effected during each ON and OFF cycle and for adaptably adjusting a corresponding variable count that determines a variable time interval for adjusting the control temperature signal. The AUTO subroutine is illustrated and described in detail with respect to FIGS. 8, 9 and 10.

A CONTRL subroutine is performed after exiting or completing the AUTO subroutine for selectively activating and deactivating the heat, air conditioning and fan relay to maintain the scheduled ambient temperature. The CONTRL subroutine is illustrated and described in detail with respect to FIGS. 11, 12, 13 and 14. Next a KYDCOD subroutine is performed for decoding user selections entered via the keyboard 26. When a keyboard entry is not detected and when the keyboard lockout switch 36 is activated for ignoring user entries, the sequential operations immediately continue with the MAIN subroutine. Otherwise, the key entries are decoded by the KYDCOD subroutine and then the sequential operations continue with performing the MAIN subroutine so that the above-described sequential subroutines operations are continuously repeated.

Interrupt routines are permanently stored in the microprocessor's ROM including a keyboard scan interrupt routine for receiving data entered via the keyboard 26. An analog to digital conversion interrupt routine for receiving the temperature signal from the temperature sensing circuit 32 is illustrated and described in detail with respect to FIG. 3. A clock interrupt routine for maintaining a current time register and for generating internal timing and control signals, particularly for dynamically adjusting the temperature control signal, is illustrated and described in detail with respect to FIGS. 4–5.

Figures 3, 4:
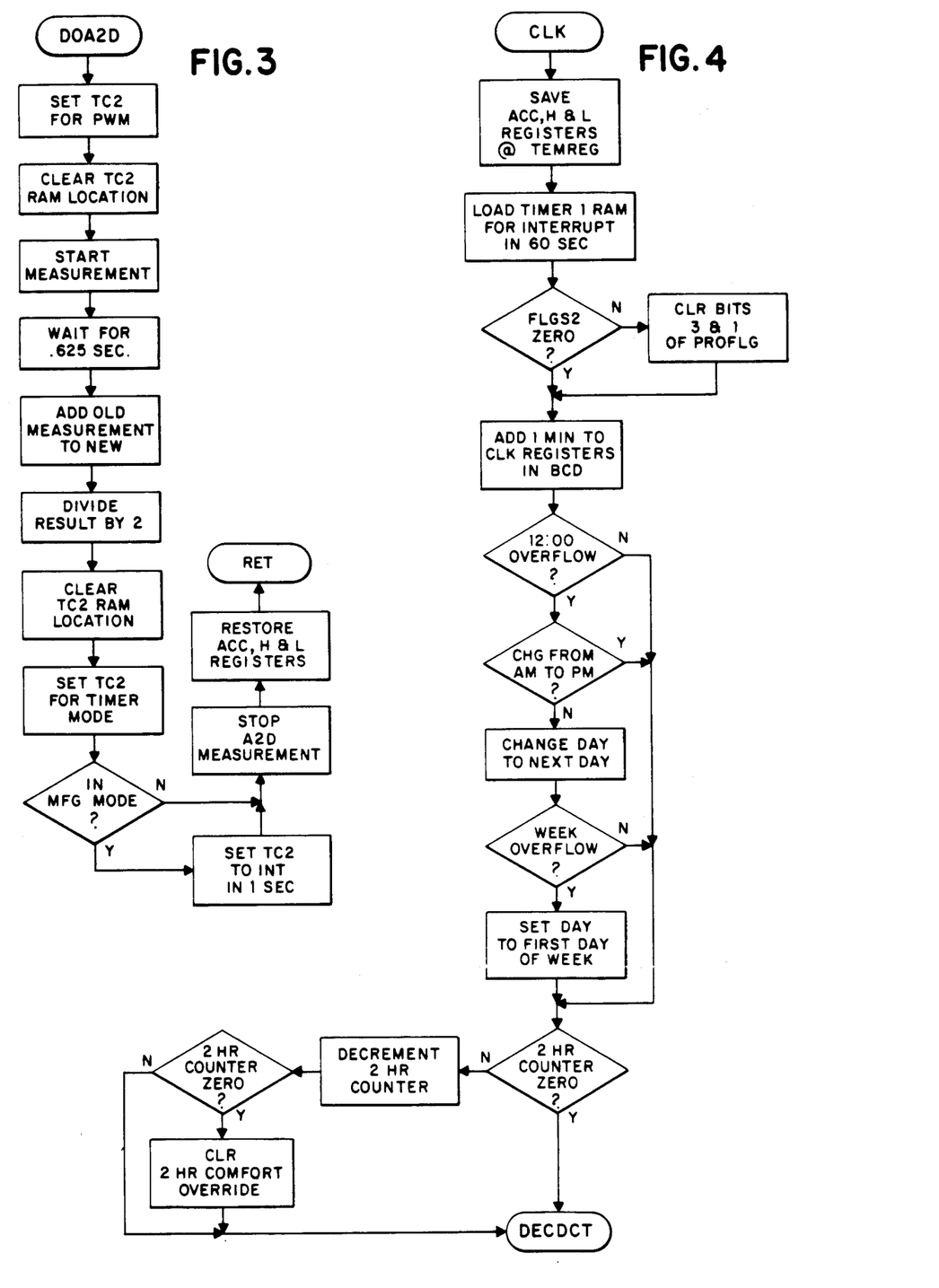

Referring now to FIG. 3, there is shown a flow chart illustrating an DOA2D interrupt routine for providing a digital representation of the PWM temperature output signal of the sensing circuitry 32. The timer/counter TC2 of the microprocessor 22 is set to generate a periodic interrupt signal, for example, on a 16 second interval for performing the DOA2D interrupt routine. The microprocessor control signal at line 206 enables the temperature detecting circuit 32 (FIG. 1). Initially in the DOA2D routine the counter/timer TC2 is set in a pulse width measurement mode for sampling the input signal at line PWM TEMP by counting at a predetermined internal pulse rate then set for timer/counter TC2. The allocated RAM address location for the timer/counter TC2 is cleared and the measurement count operation is started. After a predefined time delay, such as 0.625 seconds the measured count obtained of the timer/counter TC2 is utilized by RAM manipulated instructions to add the last prior obtained count and divide the result by 2 for software filtering of the measurement. The resultant digital value is stored corresponding to the current ambient temperature. Then the RAM address for the timer/counter TC2 is cleared and the timer/counter TC2 is again set for the timer mode. Next it is determined whether the thermostat 20 is in a manufacturing mode by testing the corresponding predetermined input switch 36. When in the manufacturing mode that is used for testing the operations of the thermostat 20, the timer/counter TC2 is set for providing an interrupt, for example, on a 1 second interval. When the manufacturing mode is not selected during normal operation, the measurement ends with the timer/counter set to provide an interrupt on the exampled 16 second interval. Then the accumulator and the H and L registers are restored and the sequential operations return from the DOA2D interrupt routine.

Figure 5:
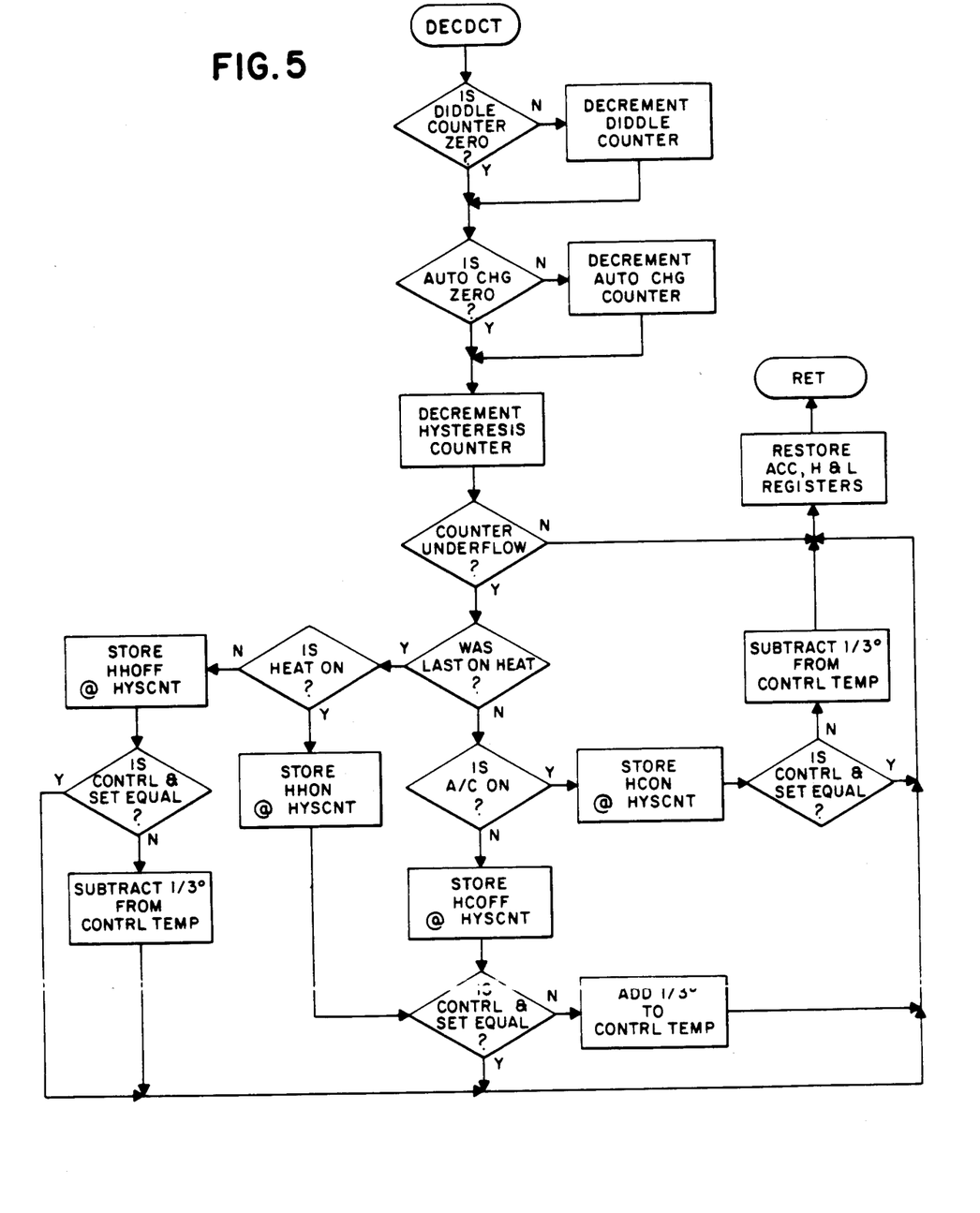

FIGS. 4 and 5 together provide a flow chart illustrating a CLK interrupt routine for maintaining a current time register and for generating control and internal timing signals. The CLK interrupt routine begins with saving the contents of the accumulator and the H and L registers in temporary registers. Then the timer/counter TC1 is set in the timer mode for providing an interrupt, for example, on a 60 second interval. Next a flag FLGS2 is checked to determine if more than one minute has elapsed since the last key activity of the keyboard 26. Flag FLGS2 is reset to zero with each key activity so that when FLGS2 is not zero, bits 1 and 3 of a program flag PROFLG are cleared with bit 1 corresponding to a program mode and bit 3 corresponding to a set clock mode. With these bits cleared the program mode ends and the thermostat 20 is enabled to continue controlling ambient temperature for providing fail safe operation when the user stops without completing a program control schedule. When either the program flag FLGS2 is zero or after clearing bits 1 and 3 of the program flag, the current time clock register is incremented to add one minute in binary coded decimals to the stored current time. Then a 12-hour counter is checked for overflow for updating from AM to PM or to the next day. Then a week counter is checked for overflow for setting the first day of the week in response to the week counter overflow. Next it is determined if a 2-hour counter is zero. The 2-hour counter is loaded for 2 hours in response to the user override selection of 2 HOUR COMFORT via keyboard 26. This determination also immediately follows the determination of no overflow condition for either the 12-hour counter or the week counter. If the 2-hour counter is not zero, then it is decremented by 1 corresponding to 1 minute. It is determined again if the 2-hour counter is zero after it has been decremented by 1. If it is then determined that the 2 hour counter is zero, a program override flag set when the user enters the 2 HOUR COMFORT selection via keyboard 26 is cleared to enable temperature control according to the stored program time and temperature schedule.

Referring to FIG. 5, the CLK interrupt routine continues with a DECDCT subroutine for generating timing and control signals as illustrated. This subroutine begins by determining if a diddle counter is zero. The diddle counter is loaded with a selected time period, for example, for 3 minutes as a state change delay time period for the air conditioning from deactivated to activated, and for 15 minutes as a control time period when the thermostat 20 is first powered up. If the diddle counter is not zero, it is decremented by 1 count. Next it is determined if an auto changeover counter is zero. The auto changeover counter establishes a minimum time delay, such as 15 minutes before enabling a change from the heating mode to the cooling mode or from the cooling mode to the heating mode. If the auto changeover counter is not zero, it is decremented by 1, then a hysteresis counter is decremented by 1. Otherwise, when the auto changeover counter is zero, the hysteresis counter is immediately decremented by 1. The hysteresis counter is loaded with a variable time period (determined by performing the AUTO subroutine shown in FIGS. 8–10) corresponding to either a heat on, heat off, air conditioning on or air conditioning off count for dynamically varying the control temperature discrete steps toward the set temperature signal. When an underflow does not result from decrementing the hysteresis counter, the accumulator and H and L registers are restored and the sequential operations are continued returning from the CLK interrupt routine.

Otherwise, when an underflow results from decrementing the hysteresis counter, the hysteresis counter is reset as follows. Utilizing a last on bit of a mode flag, a determination is made whether the last enable control signal was for activating heating. If so, a determination is made if heating is now on. If heating is on, a heat on HHON count is stored in the hysteresis counter. If the heat is not on, then a heat off HHOFF count is stored in the hysteresis counter.

After the HHOFF count is stored, a determination is made if the control temperature and the set temperature are equal. When equal, the accumulator and H and L registers are restored and the sequential program operations are continued after returning from the CLK interrupt routine. Otherwise, if the control and set temperatures are not equal then a predetermined count corresponding to, for example, ¼° F. is subtracted from the control temperature signal before restoring the accumulator and H and L registers and returning from the CLK interrupt routine.

Similarly, after the HHON count is stored, the control and set temperature signals are compared and when equal the accumulator and H and L registers are restored and the sequential program operations are continued after returning from the CLK interrupt routine. Otherwise, if the control and set temperatures are not equal then a predetermined count corresponding to, for example, ¼° F., is added to the control temperature signal before restoring the accumulator and H and L registers and returning from the CLK interrupt routine.

When the last control signal was not for heating, then it is determined if the air conditioning is on. If on, an air conditioning on HCON count is stored in the hysteresis counter. Otherwise, if the air conditioning is not on, an air conditioning off HCOFF count is stored in the hysteresis counter. Then the control temperature signal is compared to the set temperature signal and, if equal, the accumulator, H and L registers are restored and the sequential program operations are continued returning from the CLK interrupt routine. When the control and set temperatures are not equal, a predetermined count corresponding to, for example, ¼° F. is added to or subtracted from the control temperature signal after storing the HCOFF or HCON count, respectively. Then the accumulator H and L registers are again restored and the sequential operations continued returning from the CLK interrupt routine.

Figures 6, 7:
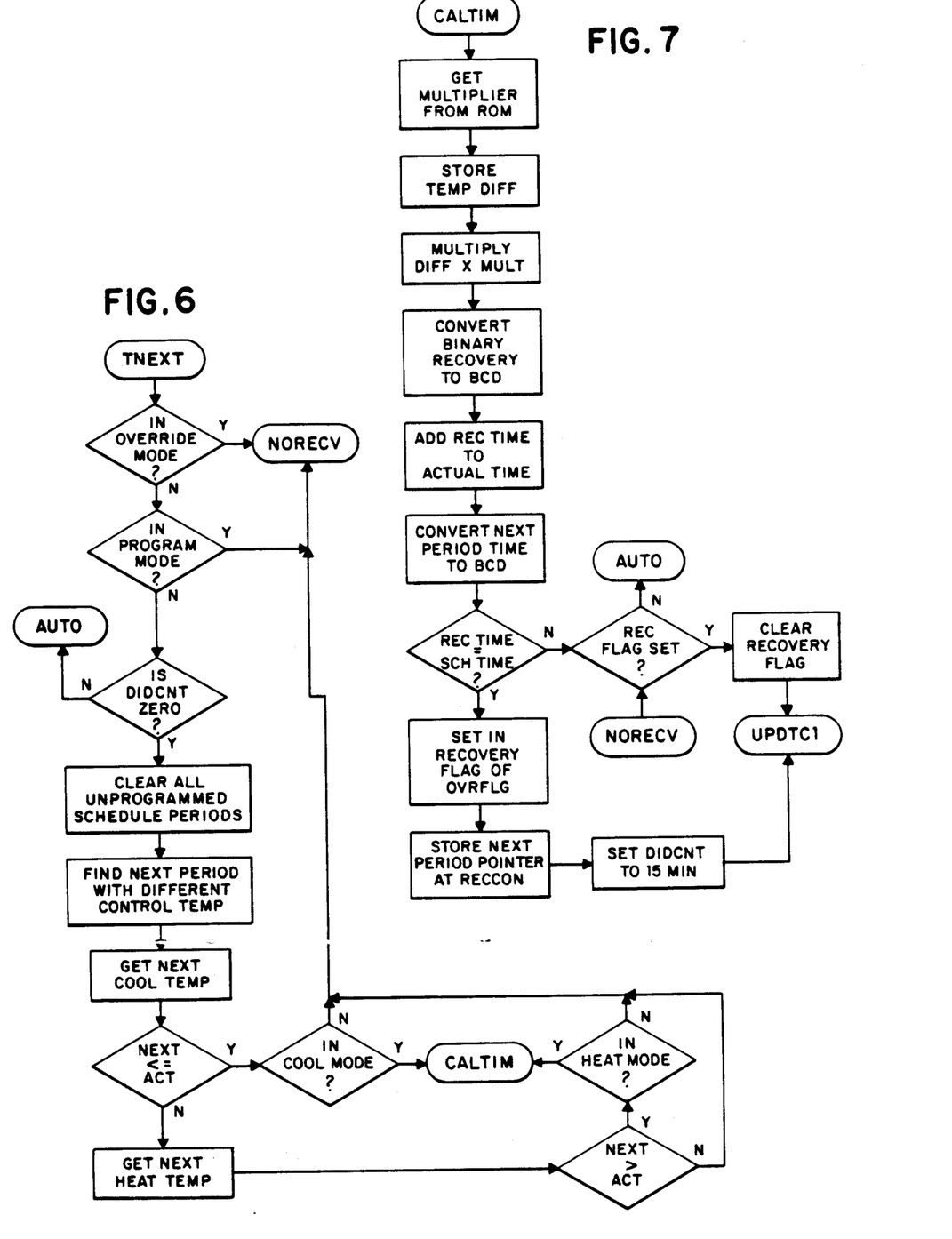
Figure 8:
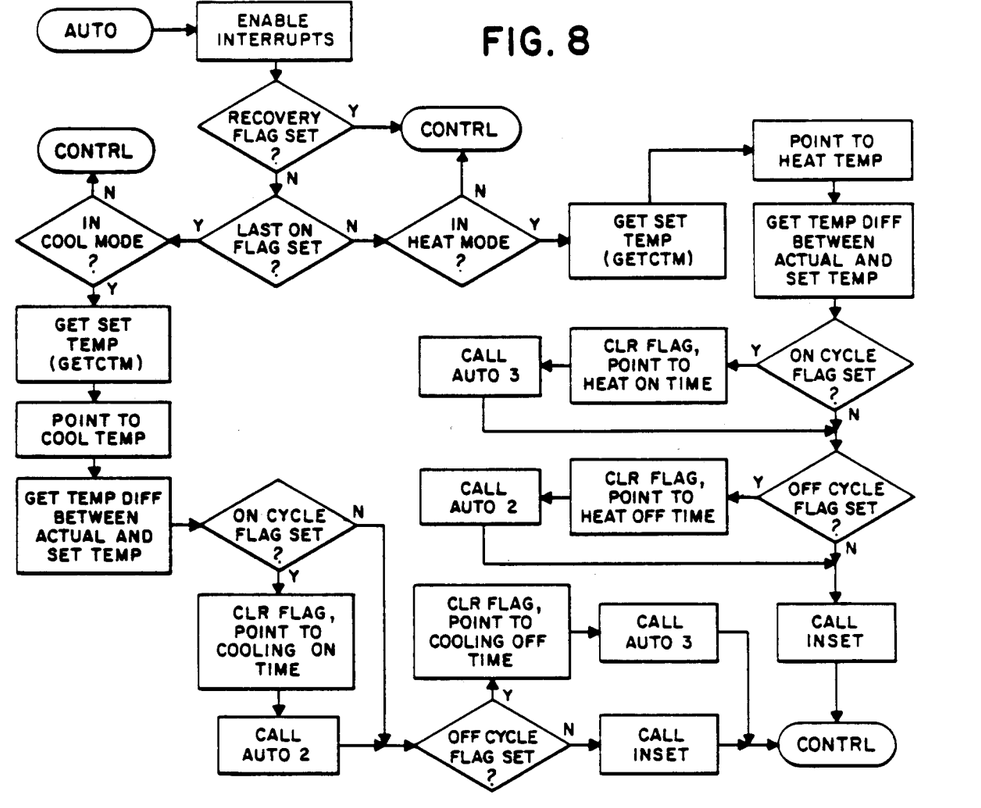
Figure 9:
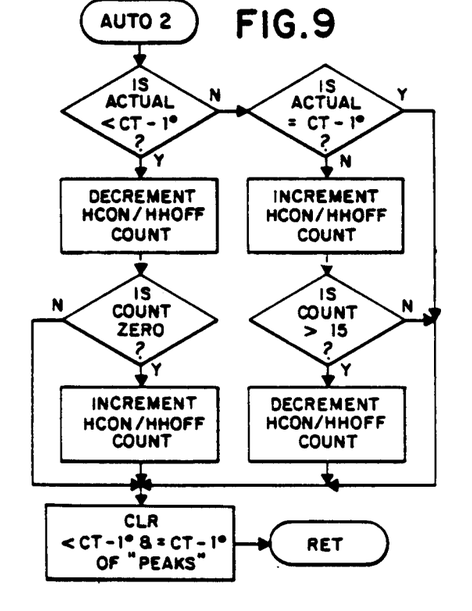
Figure 10:
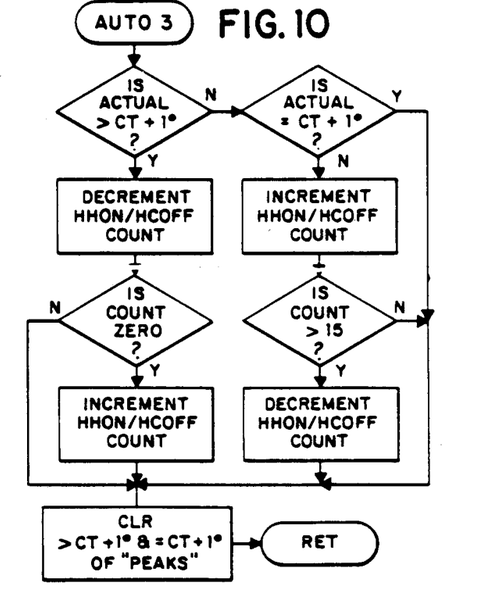

Referring to FIGS. 6 and 7 the TNEXT subroutine begins with a determination of whether or not the current operational mode is an override mode. An override flat is utilized for this determination that includes bits that are set in response to the user override selections of 2 HOUR COMFORT, CONSTANT VACANT, and CONSTANT COMFORT, via keyboard 26. The override flag also includes an in-recovery flag bit that is set to indicate a recovery operational mode recovery from scheduled vacant or setback period to the next comfort period. When in an override operational mode, a NORECV subroutine as shown in FIG. 7 is performed to exit the TNEXT subroutine. Referring to FIG. 7, the NORECV subroutine begins with testing the in-recovery flag bit of the override flag, If set, the in-recovery flag is cleared and the sequential operations continue with an in heat mode determination within the CONTRL subroutine that is later described with respect to FIG. 11. Otherwise, with the in-recovery flag not set, then the sequential operations continue with performing the AUTO subroutine (FIGS. 8-10).

If not in the override operational mode, the TNEXT subroutine continues with determining if the thermostat 20 is in the programming operational mode, utilizing a program bit of a program flag. If in the programming operational mode, the NORECV subroutine is again performed to exit the TNEXT subroutine. Otherwise, when not in the programming mode, then it is determined if the diddle counter is zero. If the diddle counter is not zero, the TNEXT subroutine is exited and the AUTO subroutine (FIGS. 8-10) is then performed. When the diddle counter is zero, scheduled time periods without program temperatures are cleared and the next time period with a different control temperature is determined. Then the next scheduled cool temperature is loaded and compared to the current actual temperature.

If the next scheduled cool temperature is less than or equal to the actual ambient temperature, then it is determined if the thermostat 20 is in the air conditioning or cool operational mode. This determination is made by testing the last on bit of the mode flag with a logic HIGH indicating that the last control output signal of the microprocessor 22 activated the air conditioning unit. When the cool operational mode is indicated, a CALTIM subroutine (FIG. 7) is performed for calculating a restart time utilizing the stored history HCON count to point to a corresponding multiplier from a data table stored in ROM of the microprocessor 22. Otherwise, if not in the cool mode, the TNEXT subroutine is exited by performing the before-described NORECV subroutine.

When determined that the next set cool temperature is not less than or equal to the actual ambient temperature, then the next scheduled heat temperature is compared to the actual ambient temperature. If the next scheduled heat temperature is not greater than the actual ambient temperature, then the NORECV subroutine is performed. Otherwise, when the next scheduled heat temperature is greater than the actual ambient temperature, then it is determined if the thermostat 20 is in the heat operational mode by utilizing the last on bit of the mode flag with a zero indicating the heat operational mode. When the heat operational mode is indicated, the CALTIM subroutine is performed utilizing the stored history HHON count to point to a corresponding multiplier from the data table stored in ROM of the microprocessor 22. Otherwise, if not in the heat mode, the NORECV subroutine is performed.

Referring to FIG. 7, the CALTIM subroutine begins with the appropriate multiplier loaded as determind by the HCON count when in the cool mode or the HHON count when in the heat mode. The required recovery time is determined by multiplying this multiplier with the temperature difference between the actual ambient temperature and the next scheduled cool or heat temperature. The resultant binary recovery time value is converted to binary coded decimal and added to the current actual time. Then the scheduled time for the next set temperature is converted to binary coded decimal and is compared to this calculated recovery time. If the calculated recovery time is not equal to the next scheduled time, then the TNEXT subroutine is exited by performing the NORECV subroutine as beforedescribed. Otherwise, when the calculated recovery time equals the next scheduled time then the in-recovery flag bit of the override flag is set. A recovery on control pointer is stored for the next scheduled time for the next set temperature. The diddle counter is loaded for 15 minutes so that the TNEXT subroutine will not be repeated until 15 minutes have elapsed. The sequential operations continue with an in heat mode determination as shown in the CONTRL subroutine in FIG. 11 so that the next scheduled heat or cool temperature is stored to update the control temperature signal.

FIGS. 8, 9 and 10 together provide a flow chart illustrating the AUTO subroutine that is performed to dynamically adjust the variable count used in the CLK subroutine (FIGS. 4 and 5) for adjusting the control temperature at the corresponding variable time interval. As shown in FIG. 8, the AUTO subroutine begins with enabling interrupts for the microprocessor 22. Then it is determined if the in-recovery flag bit of the override flag is set. If set, the AUTO subroutine is exited and the sequential program operations continue with performing the CONTRL subroutine (FIGS. 11-14). Otherwise, the AUTO subroutine continues by testing the last on bit of the mode flag. If the last on flag bit is set indicating that the last control signal was for activating air conditioning, then it is determined if the current operational mode is the cool mode. This determination is made utilizing a mode flag bit that is set to indicate the cool mode. When not in the cool mode, the sequential program operations continue with the CONTRL subroutine (FIGS. 11-14). Otherwise, when in the cool mode, the AUTO subroutine continues by loading the scheduled cool set temperature and the actual ambient temperature to determine the difference between the actual and set temperatures. An on cycle flag indicator bit is then tested. If not set, then an off cycle flag indicator bit is tested. If the off cycle flag indicator bit is likewise not set, then an INSET subroutine is performed to set an appropriate peaks indicator flag bit utilizing the calculated temperature difference between the actual ambient temperature and the scheduled set temperature CT. The peaks flag includes bits that are set indicating an actual ambient temperature of less than $CT-1°$, equal to $CT-1°$, greater than $CT+1°$ and equal to $CT+1°$. After the INSET subroutine is performed, the AUTO subroutine is exited to continue the sequential program operations with performing the CONTRL subroutine (FIGS. 11-14).

When the on cycle flag indicator bit is set, the cool on HCON count is loaded, the on cycle bit is cleared and an AUTO2 subroutine is then performed. Referring to FIG. 9, the AUTO2 subroutine begins by testing the peaks flag bit indicating that the actual ambient temperature is less than $CT-1°$. If not set, the peaks bit indicating that the actual temperature is equal to $CT-1°$ is tested. If set, indicating that the actual temperature is equal to $CT-1°$, these bits of the peaks flag are cleared and the sequential operations are continued in the AUTO subroutine (FIG. 8) following the AUTO2 subroutine.

Otherwise, when the peaks bit indicates that the actual temperature is less than the control temperature minus 1°, then the HCON count stored in the hysteresis counter is decremented by 1. Then it is determined if the resultant HCON count is zero. If the count is not zero, then the peaks bits indicating an ambient temperature of less than or equal to $CT-1°$ are cleared to exit the AUTO2 subroutine and the sequential operations then return to the AUTO subroutine. Otherwise, if the resultant HCON count is zero, then the HCON count is incremented by 1 before the peaks flags are cleared and the operation is returned to the AUTO subroutine.

When both peaks flags are not set, indicating that the actual temperature is not less than or equal to the $CT-1°$, then the HCON count is incremented by 1. Then it is determined if the resultant HCON count is greater than 15. If the HCON count is greater than 15, then the HCON count is decremented by 1 before the peaks flags are cleared and the sequential operations are returned to the AUTO subroutine. Otherwise, if the HCON count is less than or equal to 15, then the peaks flags are cleared and the sequential operations are returned to the AUTO subroutine.

After the completion of the AUTO2 subroutine, the off cycle flag indicator bit is tested. If set, the off cycle flag is cleared and the sequential operations continue with performing an AUTO3 subroutine shown in FIG. 10. Otherwise, with the off cycle flag not set, the sequential operations continue with performing the before-described INSET subroutine.

With the HCOFF count loaded, the AUTO3 subroutine begins with testing the peaks flag bit set to indicate that the actual temperature is greater than $CT+1°$. If set, the HCOFF count is decremented by 1. Then it is determined if the resultant HCOFF count is zero. If the count is not zero, the AUTO3 subroutine is completed by clearing the peaks flags indicating ambient temperature greater than or equal to $CT+1°$. The sequential operations are returned to the AUTO subroutine following the AUTO3 subroutine. Otherwise, if the resultant HCOFF count is zero, then the HCOFF count is incremented by 1 prior to similarly exiting the AUTO3 subroutine. When the peaks flag is not set, indicating that the actual temperature is not greater than $CT+1°$, then the peaks flag bit that is set to indicate that the actual temperature equals $CT+1°$ is tested. If set, the AUTO3 subroutine is exited without modifying the HCOFF count. Otherwise, if the equal to $CT+1°$ flag is not set, then the stored HCOFF count is incremented by 1. Then it is determined if the resultant HCOFF count is greater than 15. When the HCOFF count is greater than 15, HCOFF count is decremented by 1 prior to exiting the AUTO3 subroutine. Otherwise, the AUTO3 subroutine is exited without further change of the resultant HCOFF count.

After the completion of the AUTO3 subroutine in the cool mode, the sequential operations return to the AUTO subroutine as shown in FIG. 8. The AUTO subroutine is then exited and the sequential program operations continue with performing the CONTRL subroutine (FIGS. 11-14).

Referring again to FIG. 8 with the testing of the last ON bit of the mode flag in the AUTO subroutine, when not set indicating that the last control signal was for activating heating, then it is determined if the current operational mode is the heat mode. This determination is made utilizing a mode flag bit that is set to indicate the head mode. When not in the heat mode, the sequential program operations continue with the CONTRL subroutine (FIGS. 11-14). Otherwise, when in the heat mode, the AUTO subroutine continues by loading the scheduled heat set temperature and the actual ambient temperature to determine the difference between the actual and set heat temperatures. Then the on cycle flag bit is tested. If not set, then the off cycle flag indicator bit is tested. If the off cycle bit is likewise not set, then the before-described INSET subroutine is performed. Otherwise, when the on cycle bit is set, the heat on HHON count is loaded, the on cycle flag is cleared and the AUTO3 subroutine is performed for dynamically adjusting the HHON count as described above with respect to the cool off HCOFF count when in the cool mode during the off cycle. After the AUTO3 subroutine is completed, the AUTO subroutine continues with testing the off cycle bit. When the off cycle bit is set, the heat off HHOFF count is loaded, the off cycle bit is cleared and then the AUTO2 subroutine is performed for dynamically adjusting the HHOFF count as described above with respect to the HCON count when in the cool mode during the on cycle. After the AUTO2 subroutine is completed, then the INSET subroutine is performed prior to exiting the AUTO subroutine and continuing the sequential program operations with performing the CONTRL subroutine.

Referring now to FIGS. 11–14, that together provide a flow chart illustrating the CONTRL subroutine for activating and deactivating the heat and air conditioning system, the CONTRL subroutine begins by testing the program flag. If set indicating the scan operational mode, then the program mode bit of the program flag is tested to determine if the current mode is the programming mode. When the programming mode is indicated, then the control test register is set. When the programming mode is not indicated or after the control test register is set, then the KYDCOD subroutine is performed for decoding the user entries via keyboard 26.

Figures 11, 12:
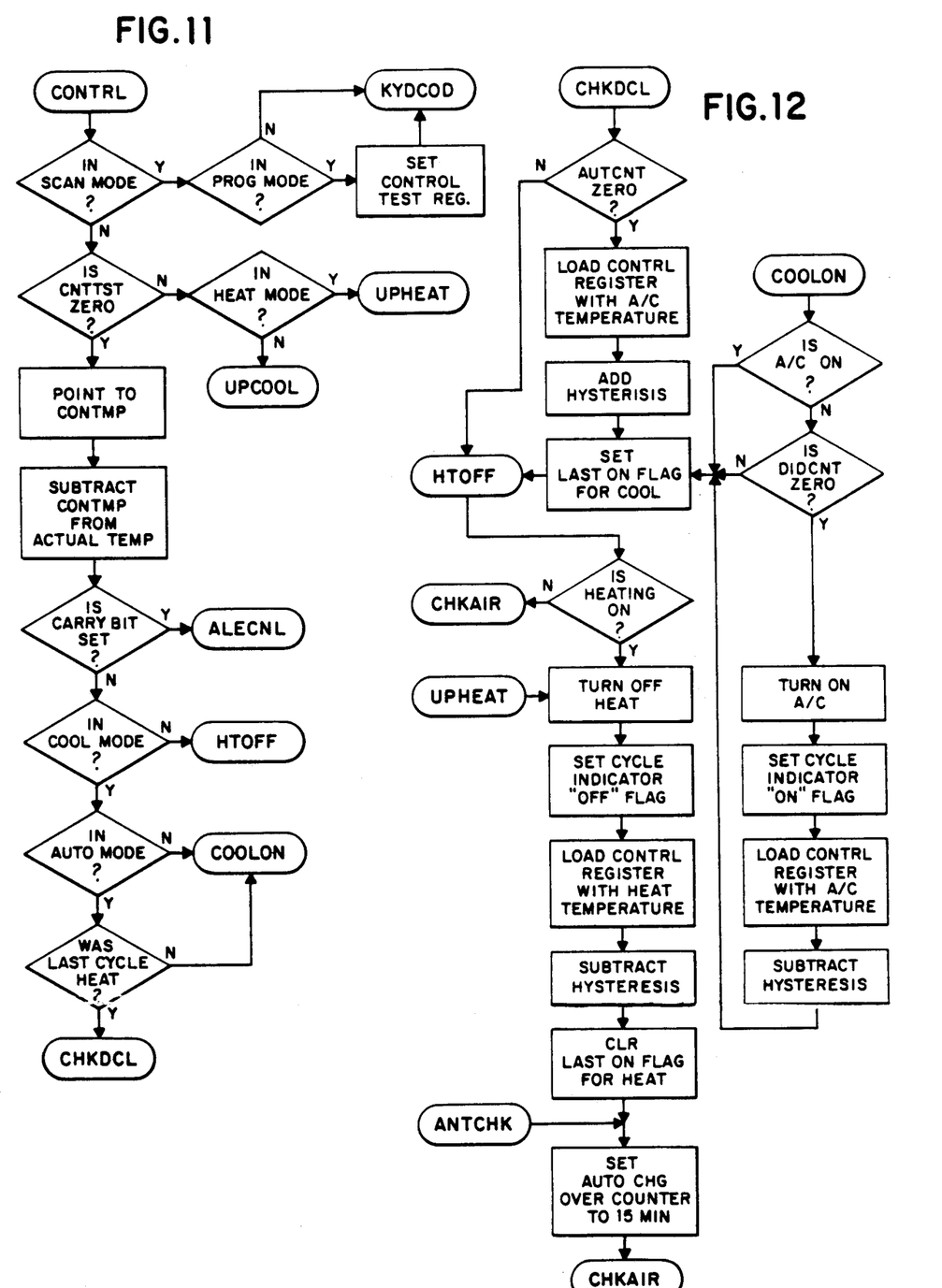
Figures 13, 14:
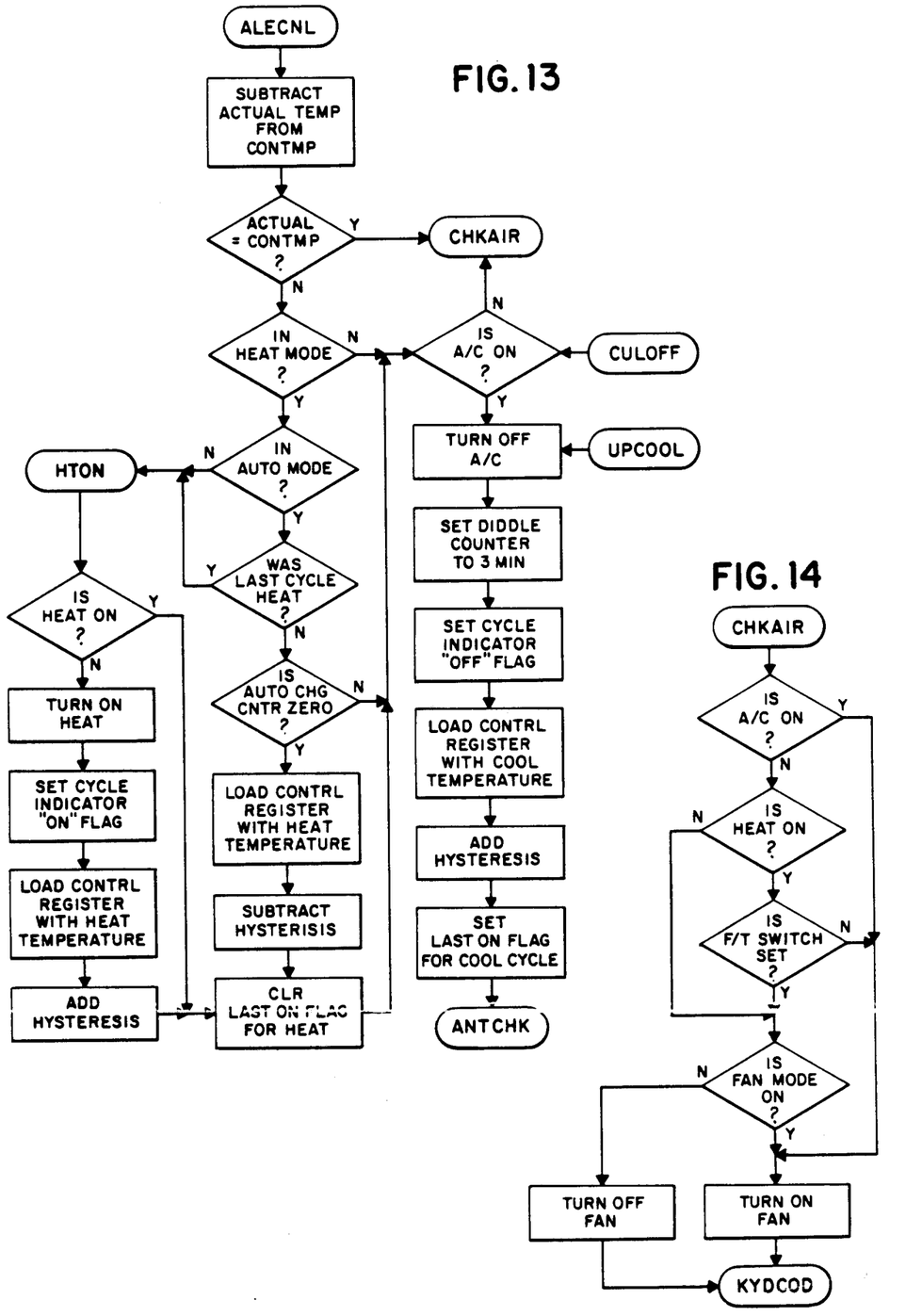

Otherwise, when not in the scan mode the CONTRL subroutine is continued. Then it is determined if the control test register is zero. If the control test register is not zero, indicating a programming change in time or temperature, then the last on indicator bit of the mode flag is tested. If the last control signal was for heat then an UPHEAT subroutine is performed as shown in FIG. 12 for deactivating heating. Otherwise, if the last on control signal was for air conditioning, then an UPCOOL subroutine is performed as shown in FIG. 13 for deactivating cooling. After the appropriate UPCOOL or UPHEAT subroutine is completed, then an ANTCHK subroutine (FIG. 12) is performed for loading the predetermined 15 minute time period to the auto changeover counter. Then a CHKAIR subroutine shown in FIG. 14 is performed for providing an appropriate fan control signal for activating or deactivating the fan. Following the completion of the CHKAIR subroutine, the sequential operations are continued by performing the KYDCOD subroutine for decoding the user entries made via keyboard 26. Then the sequential subroutines shown in FIG. 2 are again repeated.

When the control test register is zero, then the CONTRL subroutine continues by subtracting the current control temperature from the actual temperature. If the actual temperature, is less than or equal to the control temperature then a carry bit results. In response to the set carry bit, an ALECNL subroutine shown in FIG. 13 is then performed for determining the current operational mode and then activating heating or deactivating air conditioning. Otherwise, if the carry bit is not set indicating that the actual temperature is greater than the current control temperature, then the CONTRL subroutine continues as shown in FIG. 11 with a current operational mode determination and then appropriately deactivating heating or activating air conditioning. More particularly, as shown in FIG. 11, when the carry bit is not set, then the in cool mode bit of the mode flag is tested. If not in the cool mode, the sequential operations branch to a HTOFF subroutine shown in FIG. 12. Otherwise, if in the cool mode, then it is determined if the current operational mode is the automatic mode. If not in the automatic mode, then a COOLON subroutine is performed for activating air conditioning. When in the automatic mode, the last on bit of the mode flag is tested as shown in FIG. 11. If the last control signal was not for heat, then the COOLON subroutine is likewise performed without delay. When the last control signal was for heat, then a CHKDCL subroutine is performed effecting the changeover to the cool operational mode.

Referring to FIG. 12, the CHKDCL subroutine begins by testing if the autochangeover counter is zero. If the auto changeover counter is zero, then the set cool temperature is loaded in the control register. Then a hysteresis value is subtracted from the set cool temperature to provide the initial cool control temperature. After the last on bit of the mode flag is set to indicate air conditioning as being last activated or when the auto changeover counter is not zero, then the HTOFF subroutine is performed for deactivating heating, if on.

The HTOFF subroutine begins with testing the heat control output signal to determine if the heat is on. If the heat is on, then an UPHEAT subroutine is performed for deactivating heating. If the heat is off, then the CHKAIR subroutine is performed to complete the CONTRL subroutine before entering the KYDCOD subroutine (FIG. 2). When the heat is on, then the UPHEAT subroutine begins by applying the control signal for deactivating heat at line 38 in FIG. 1. Then the cycle indicator off flag bit is set to indicate an off cycle and the set heat temperature is loaded in the control register. A predetermined initial hysteresis value is subtracted from the set heat temperature to provide the control heat temperature. Then the last on bit of the mode flag is cleared which completes the UPHEAT subroutine.

The CONTRL subroutine continues with performing the ANTCHK subroutine. The ANTCHK subroutine begins by loading the contents of the auto changeover counter in the H and L registers. If zero, then the other changeover counter is set for the exampled 15 minute time period.

The COOLON subroutine begins by testing the cool control output signal (line 40, FIG. 1) to determine if the air conditioning is now on. If the air conditioning is on, then the last on flag of the mode flag is set and the before-described HTOFF subroutine is then performed. Otherwise, if the air conditioning is not on, then it is determined if the diddle counter is zero. If the diddle counter is not zero, then the COOLON subroutine is similarly exited. Otherwise, if the diddle counter is zero, then an output signal is provided for activating air conditioning. Then the cycle indicator on flag is set and the scheduled set cool temperature is loaded into the control register. Then a hysteresis value is subtracted from the set cool temperature to provide the initial cool control temperature. The last on flag of the mode flag is set which completes the COOLON subroutine. The HTOFF subroutine is then performed.

Referring to FIG. 13, the ALECNL subroutine begins with subtracting the actual ambient temperature from the control temperature. If the result is zero, indicating that the actual and control temperatures are equal, then the CHKAIR subroutine is performed prior to returning to the KYDCOD subroutine (FIG. 2). Otherwise, when the actual and control temperatures are not equal, then the heat bit of the mode flag is tested to determine if the heat mode is indicated. When not in the heat mode, then the CULOFF subroutine is performed for deactivating air conditioning, if on. When in the heat mode, then the cool bit of the mode flag is tested to determine if the auto changeover mode is indicated. When the auto changeover mode is indicated, then the last on bit is tested to determine if heat was last on. When in the auto changeover mode and heat was last on or when not in the auto changeover mode, then a HTON subroutine is performed for activating heating. The HTON subroutine begins with testing the microprocessor heating control output signal (line 38, FIG. 1) to determine if the heat is now on. If heat is on, then the last on flag of the mode flag is cleared to indicate that the last control output signal was for activating heating. If the heat is not on, then an output signal is provided for activating heating. Then the cycle indicator on flag is set and the scheduled set heat temperature is loaded into the control register. Then a hysteresis value is added to the set heat temperature to provide the initial heat control temperature. Then the last on flag of the mode flag is cleared.

When in the auto changeover mode and heat was not last on, then the ALECNL subroutine continues by testing if the auto changeover counter is zero. If the auto changeover counter is zero, then the set heat temperature is loaded in the control register. Then a hysteresis value is subtracted from the set heat temperature to provide the initial heat control temperature. Then the last on flag is cleared to indicate heat.

After the last on flag of the model flag is cleared or when the auto changeover counter is not zero, then the CULOFF subroutine is performed. The CULOFF subroutine begins with testing the cool control output signal (line 40, FIG. 1) to determine if the air conditioning is now on. If the air conditioning is on, then the UPCOOL subroutine is performed for deactivating the air conditioning. The UPCOOL subroutine begins with applying a control output signal for deactivating the air conditioning. Then the diddle counter is loaded for the 3 minute time period, the cycle off indicator flag is set and the control register is loaded with the set cool temperature. The predetermined hysteresis value is then added to the set cool temperature to provide the initial cool control temperature. Then the last on bit of the mode flag is set to indicate that the last control signal was for cooling. Then the sequential operations branch to the ANTCHK subroutine in FIG. 12.

Otherwise, at the beginning of the CULOFF subroutine when determined that the air conditioning is not on, then the sequential operations branch to the CHKAIR subroutine as shown in FIG. 14.

Referring to FIG. 14, the next CHKAIR subroutine performed is shown. The CHKAIR subroutine begins with testing the cool control output to determine if the air conditioning is on. If the air conditioning is on, then the fan is turned on. Otherwise, if the air conditioning is off, then the heat control output is tested to determine if the heat is on. If the heat is not on, then the mode flag is tested to determine if the continuous fan mode is selected. When in the fan mode, then the fan is activated. If not in the fan mode then the fan is deactivated. Otherwise, if the heat is on, then the fan control switch 36 is tested to determine if continuous fan on is selected. If selected, then the fan on control is set. Otherwise, the mode flag is tested to determine if in the fan mode as before described. After the appropriate fan on or fan off signal is set, the sequential operations continue with the KYDCOD subroutine shown in FIG. 2.

In summary, the thermostat 20 provides improved control of the temperature conditioning system for maintaining the ambient temperature within a predefined range of the scheduled set temperature for varying load conditions, and includes an improved power supply circuit for simply and effectively providing its operating power with existing wiring for conventional electromechanical thermostats utilizing an external power source of the temperature conditioning system.

Obviously, many modifications and variations of the present invention are possible in light of the above teachings. Thus, it is to be understood that, within the scope of the appended claims, the invention may be practiced otherwise than as specifically described herein.

What is claimed and desired to be secured by Letters Patent of the United States is:

1. A power supply circuit for providing operating power for a programmable electronic digital thermostat including a controlled semiconductor switch connected in series with an external alternating current power source providing an alternating current for a controlled temperature conditioning system, said power circuit comprising:

rectifier means coupled between said controlled semiconductor switch and the external alternating current power source for rectifying the alternating current to produce a direct current voltage;

regulator means for providing a predetermined supply voltage to the programmable electronic digital thermostat;

said regulator means having an input coupled to said rectifier means;

a capacitor connector to said regulator means input for charging said capacitor to a first predetermined voltage potential; and control means connected between said capacitor and controlled semiconductor switch for sensing the voltage potential of said capacitor and for deactivating said semiconductor switch in response to a sensed voltage potential below a second predetermined voltage potential, said capacitor having a predetermined capacitance, whereby recharging said capacitor to said first predetermined voltage potential is enabled without interrupting the controlled temperature conditioning system.

2. A power supply circuit as recited in claim 1 further comprising a battery having a predetermined voltage potential and voltage sensing means for sensing said capacitor voltage potential and for enabling said battery for providing operating power in response to a sensed voltage potential below said battery voltage potential.

3. A power supply circuit as recited in claim 2 further including voltage sensing means for sensing the voltage potential of said battery and means for generating a low-battery signal in response to a predetermined sensed battery voltage potential.

4. A power supply circuit as recited in claim 3 further including means for generating a reset signal in response to a sensed predetermined second battery voltage potential.

5. A programmable electronic digital thermostat for controlling a temperature conditioning system to maintain a scheduled set ambient temperature, said thermostat comprising:

controlled semiconductor switch means for selectively activating and deactivating the temperature conditioning system;

a microprocessor for storing a program and for performing logical control operations in accordance with said stored program;

temperature sensing means coupled to said microprocessor for providing a pulse width modulated PWM signal representative of ambient temperature in response to an enable control signal from said microprocessor said PWM temperature signal applied to said microprocessor;

said microprocessor being cooled to said controlled semiconductor switch means and generating control signals for activating and deactivating said semiconductor switch means in response to a determined temperature difference between said PWM temperature signal and a dynamically adjusted temperature control signal, said dynamically adjusted temperature control signal being set to one of an initial minimum or maximum value relative to said scheduled set ambient temperature in response to each of said microprocessor generated control signals for activating and deactivating said semiconductor switch means, said temperature control signal being adjusted in discrete steps toward said set ambient temperature after an elapsed variable time interval.

6. A programmable electronic digital thermostat as recited in claim 5 further comprising an oscillator means coupled to said microprocessor for providing a periodic oscillator frequency input.

7. A programmable electronic digital thermostat as recited in claim 6 wherein said stored program includes an interrupt routine for maintaining a real time register.

8. A programmable electronic digital thermostat as recited in claim 5 wherein said stored program includes subroutine means for adjusting said variable time interval, said variable time interval adjusting subroutine means including means for identifying each of said microprocessor generated control signals for activating and deactivating said semiconductor switch means, means responsive to each of said identified microprocessor generated control signals for comparing said scheduled set temperature and said ambient temperature signal to determine a temperature difference, means responsive to said determined temperature difference for selectively adjusting a corresponding count for each of said identified microprocessor generated control output signals, said selectively adjusted count being proportional to said variable time interval.

9. A programmable electronic digital thermostat as recited in claim 8 wherein said stored program includes recovery subroutine means for determining a required recovery time interval to achieve a next scheduled set temperature at a next scheduled time, said recovery subroutine means including means for comparing said ambient temperature signal and said next scheduled set temperature to determine a temperature difference and means responsive to said selectively adjusted corresponding count for said microprocessor generated control signals for activating said semiconductor switch means for identifying a corresponding rate multiplier and means for multiplying said determined temperature difference with said identified multiplier to determine the required recovery time interval.

10. A programmable electronic digital thermostat as recited in claim 9 wherein said recovery subroutine means includes means for comparing said determined recovery time interval and said next scheduled time and means responsive to said compared times for changing said control temperature relative to said next scheduled set temperature.

11. A programmable electronic digital thermostat as recited in claim 5 wherein said microprocessor comprises a complementary metal oxide semiconductor integrated circuit device.

12. A programmable electronic digital thermostat as recited in claim 5 further comprising entry means coupled to said microprocessor for entering user selections.

13. A programmable electronic digital thermostat as recited in claim 5 further comprising display means coupled to said microprocessor for displaying actual time and temperature data and user selected data.

14. A programmable electronic digital thermostat as recited in claim 13 wherein said display means comprises a liquid crystal display.

15. A temperature detecting circuit for providing a pulse width modulated signal representative of ambient temperature for a programmable electronic digital thermostat including a microprocessor providing control signals, said temperature detecting circuit comprising:

temperature responsive means for providing a variable resistance value in relation to ambient temperature;

means responsive to said variable resistance value and an enable control signal from said microprocessor for generating a signal having a slope characteristic with time, said slope characteristic being determined by said resistance value;

comparator means for comparing said generated signal with a first predetermined value and a second predetermined value to generate said pulse width modulated signal, wherein said means responsive to an enable control signal from said microprocessor for generating a signal having a slope characteristic with time includes a capacitor means coupled to said temperature responsive means for charging to a predetermined potential, and switch means coupled to said capacitor means for providing a discharge path for said capacitor means in response to said enable control signal.

* * * * *

UNITED STATES PATENT AND TRADEMARK OFFICE
CERTIFICATE OF CORRECTION

PATENT NO. : 4,799,176

DATED : January 17, 1989

INVENTOR(S) : JOSEPH J. CACCIATORE

It is certified that error appears in the above-identified patent and that said Letters Patent is hereby corrected as shown below:

Column 18, line 28, change "connector" to --connected--.

Column 19, line 4, change "cooled" to --coupled--.

Signed and Sealed this

Fifteenth Day of August, 1989

Attest:

DONALD J. QUIGG

Attesting Officer

Commissioner of Patents and Trademarks